United States Patent [19]

Woods, Jr.

[11] Patent Number: 5,127,234
[45] Date of Patent: Jul. 7, 1992

[54] COMBINED ABSORPTION COOLING/HEATING

[75] Inventor: Richard R. Woods, Jr., Glenview, Ill.

[73] Assignee: Gas Research Institute, Chicago, Ill.

[21] Appl. No.: 739,690

[22] Filed: Aug. 2, 1991

[51] Int. Cl.⁵ ............................................. F25B 15/00
[52] U.S. Cl. ...................................... 62/101; 62/476; 62/486
[58] Field of Search ................. 62/476, 141, 483, 484, 62/486, 487, 101

[56] References Cited

U.S. PATENT DOCUMENTS

| | | | |
|---|---|---|---|
| 2,212,869 | 8/1940 | Tornquist | 257/7 |
| 3,389,574 | 6/1968 | McGrath | 62/476 |
| 3,407,625 | 10/1968 | McDonald | 62/476 |
| 3,517,522 | 6/1970 | Ozono et al. | 62/141 |
| 4,031,712 | 6/1977 | Costello | 62/483 |
| 4,152,904 | 5/1979 | Hester | 62/476 |
| 4,285,208 | 8/1981 | Takeshita | 62/141 |
| 4,315,411 | 2/1982 | Vardi et al. | 62/112 |
| 4,328,679 | 5/1982 | Usui et al. | 62/141 |
| 4,402,795 | 9/1983 | Erickson | 203/25 |
| 4,485,638 | 12/1984 | Reimann | 62/476 |
| 4,534,180 | 8/1985 | Yasuda et al. | 62/141 |
| 4,593,531 | 6/1986 | Fujimoto | 62/101 |
| 4,594,856 | 6/1986 | Rothmeyer | 62/112 |
| 4,594,857 | 6/1986 | Mucic | 62/141 |
| 4,596,122 | 6/1986 | Kantner | 62/141 |
| 4,651,819 | 3/1987 | Yumikura et al. | 165/115 |
| 4,674,297 | 6/1987 | Vobach | 62/476 |

Primary Examiner—Albert J. Makay
Assistant Examiner—William C. Doerrler
Attorney, Agent, or Firm—Speckman & Pauley

[57] ABSTRACT

An improved process and apparatus for absorption cooling in which an absorbent-refrigerant solution from an absorber is heated in a generator producing absorbent-refrigerant vapor, the absorbent-refrigerant vapor is separated and condensed producing pure liquid refrigerant and an absorbent-enriched solution, the absorbent-enriched solution is returned to the absorber, the pure liquid refrigerant is evaporated producing pure refrigerant vapor, and the pure refrigerant vapor is absorbed into the absorbent-enriched solution. A dilute absorbent-refrigerant solution and a concentrated absorbent-refrigerant solution are generated simultaneously in a solution concentration means disposed between the absorber and generator. The dilute absorbent-refrigerant solution is heated to produce a first pure refrigerant vapor and the absorbent-enriched solution. The first pure refrigerant vapor is condensed in the generator in thermal contact with the absorbent-enriched solution producing pure liquid refrigerant. The pure liquid refrigerant is evaporated producing a second pure refrigerant vapor which is subsequently absorbed into the concentrated absorbent-refrigerant solution.

19 Claims, 5 Drawing Sheets

COMBINED ABSORPTION COOLING/HEATING

BACKGROUND OF THE INVENTION

1. Field of the Invention

This invention relates to an absorption cooling and heating system, and more particularly to an absorption cycle having a solution concentrator between the absorber and the generator of the cycle.

2. Description of the Prior Art

Absorption cooling systems are well established in the prior art. In such systems, refrigerant vapor is absorbed in an absorber. The resulting absorbent-refrigerant solution is circulated to a generator in which it is heated. The refrigerant is separated from the absorbent-refrigerant solution and condensed after which it is recycled to an evaporator in which it is vaporized to be reabsorbed in the absorber and begin the cycle again. Such systems are generally taught by U.S. Pat. 2,212,869 and U.S. Pat. No. 4,594,856. In such systems, the thermal energy required to heat the generator is greater than or equal to the cooling effect provided by the evaporator.

In U.S. Pat. No. 4,402,795, a two stage generator process in which the output of the first stage generator is a more concentrated absorbent-refrigerant solution being fed to the second stage is disclosed. The thermal energy provided to the second stage generator is recycled by integrating the condenser for the second stage generator with the first stage generator. In such systems, the thermal energy required to heat the generators is greater than or equal to half the cooling effect provided by the evaporator.

Also taught by the prior art are methods of controlling the reliable performance of an absorption cooling system, most notably, U.S. Pat. No. 3,517,522 and U.S. Pat. No. 4,328,679 which teach techniques for adjusting and controlling absorbent solution concentrations, and U.S. Pat. No. 4,315,411 which teaches the use of additives to improve the heat transfer characteristics in the absorber assembly.

Absorption cooling system improvements have generally focussed on the absorbent-refrigerant solution, changing its concentration or composition to provide greater operating efficiency. See U.S. Pat. No. 4,485,638, U.S. Pat. No. 4,534,180, U.S. Pat. No. 4,593,531, U.S. Pat. No. 4,594,857, and U.S. Pat. No. 4,596,122.

Another cooling system improvement is disclosed in U.S. Pat. No. 4,152,904 which teaches the use of a solution concentrator, a single stage separation process in which refrigerant-absorbent solution is pumped under pressure to a membrane separation unit where the refrigerant is selectively passed through a membrane separator producing pure refrigerant. The refrigerant is then circulated through a heat exchange system for heating and/or cooling of the desired areas after which it is evaporated and circulated directly to an absorber where it is absorbed into the absorbent solution, generating the refrigerant-absorbent solution. The energy required to separate the refrigerant from the absorbent refrigerant solution is totally supplied by the pump and is equal to the energy which holds the refrigerant in the solution.

In a conventional absorption cooling cycle, heat applied to the generator to effectuate separation of the refrigerant from the absorbent-refrigerant solution is lost in a cooling tower or similar cooling process when condensing the refrigerant. Consequently, at least a portion of the sensible heat of the refrigerant is no longer available for doing useful work.

SUMMARY OF THE INVENTION

It is an object of this invention to provide an improved absorption cooling and heating system which is more efficient than conventional systems.

It is another object of this invention to provide an absorption cooling and heating system in which separation of the refrigerant from the absorbent-refrigerant solution is achieved in at least two stages.

It is another object of this invention to provide a two-stage absorption cooling and heating system in which the first stage of separation of the refrigerant from the absorbent-refrigerant solution is accomplished in a solution concentrator situated between the absorber and the generator of the absorption process. The solution concentrator generates a dilute absorbent-refrigerant solution for the generator and a concentrated absorbent-refrigerant solution for the absorber.

It is yet another object of this invention to provide a two-stage absorption cooling and heating system in which the second stage of separation of the refrigerant from the absorbent-refrigerant solution is accomplished in a manner permitting recovery and recycling of thermal energy (heat of vaporation) required to produce the pure refrigerant, thereby increasing the overall energy efficiency of the system by de-coupling the thermal energy required to drive the generator from the cooling effect provided by the evaporator. In this manner, an essential feature of the invention, namely, the 100% thermal overlap of the generator and refrigerant condensation processes, that is, where the temperature of the condensed refrigerant is greater than or equal to the temperature at which the generator operates, is provided.

Still another object of this invention is to provide an absorption cooling and heating system in which the sensible heat retained in the refrigerant flowing out of the generator is recovered, thereby further increasing the overall energy efficiency of the system. By transferring the sensible heat of the condensed refrigerant to a low temperature thermal process such as a domestic hot water system or space heating system as envisioned in embodiments of this invention, the sensible heat of the refrigerant can be recovered, further increasing the energy efficiency of this invention compared to conventional absorption cooling and heating systems.

Yet another object of this invention is to provide an absorption cooling and heating system in which excess heat from the solution concentration process is recovered, thereby further increasing the overall energy efficiency of the system.

Still another object of this invention is to provide an absorption cooling and heating system which can be used in cooling only, cooling and heating, and heating only modes. In the heating only mode, the evaporator is used to extract heat from ambient conditions and the usable heat is recovered from the absorber process and supplemented by the other heat sources of the cycle.

The disclosed invention provides an improvement comprising a two-stage process, the first stage of which is a solution concentrator used to generate two absorbent-refrigerant solutions, a dilute absorbent-refrigerant solution which flows to the generator and a concentrated absorbent-refrigerant solution which flows to the absorber. The second stage involves recycling the heat of vaporization in the generator. The advantage of the two-stage process of this invention is that thermal energy required to produce pure refrigerant is recovered and drives the generation process, improving absorption cooling system efficiency. By pressurizing the refrigerant vapor above the dilute absorbent-refrigerant solution in the generator according to this invention, the refrigerant is condensed at a temperature greater than the operating temperature of the generator. In accordance with one embodiment of this invention, pressurization is accomplished by a compressor. In accordance with another embodiment, pressurization is accomplished by an ejector powered by a higher pressure steam source. Condensation occurs in thermal contact with the absorbent refrigerant solution in the condensed refrigerant generator, giving up its heat of vaporization to the absorbent-refrigerant solution in the generator. The pure refrigerant condensate is not mixed into the absorbent-refrigerant solution in the generator.

In yet another embodiment of this invention, the pure refrigerant vapor condenses at the temperature of the vapor pressure of the refrigerant in the generator and a heat pump is used to increase the quality of the thermal energy released to a temperature greater than the operating temperature of the generator.

An essential feature of the improved system according to this invention is a solution concentration process which generates two absorbent-refrigerant solutions, one dilute and one concentrated. In one embodiment of this invention, solution concentration is accomplished by electrodialysis. In another embodiment of this invention, solution concentration is accomplished by electrolysis/reverse electrolysis. In still another embodiment of this invention, solution concentration is achieved by reverse osmosis. In still another embodiment of this invention, solution concentration is accomplished by a thermal driven evaporation/absorption process over the range of the temperatures and concentrations between the absorber and generator. In this embodiment, refrigerant is evaporated from the concentrated absorbent-refrigerant solution at a temperature, passes through a vapor gap and is absorbed by the dilute absorbent-refrigerant solution which is at a lower temperature and therefore a lower refrigerant vapor pressure. Based on the respective concentrations of the two absorbent-refrigerant solutions, the temperature of the two solutions are maintained to effect a vapor pressure difference such that refrigerant vapor from the concentrated solution travels through the vapor gap to the dilute solution and is absorbed. Other solution concentration means may also be used satisfactorily in this invention or combinations of these processes and by no way is this invention limited by the methods of the solution concentration process.

Another essential feature of this invention is the recovery of excess heat from the solution concentration process, further increasing the energy efficiency of this absorption cooling and heating process.

Another essential feature of this invention is the 100% thermal overlap of the generator and refrigerant condensation processes, that is, the temperature of the condensed refrigerant is greater than or equal to the temperature at which the generator operates. By transferring the condensed refrigerant to a low temperature thermal process such as a domestic hot water system as envisioned in one embodiment of this invention, the sensible heat of the refrigerant can be recovered, further increasing the energy efficiency of this invention compared to conventional absorption cooling and heating systems.

DESCRIPTION OF PREFERRED EMBODIMENTS

Figure 1:
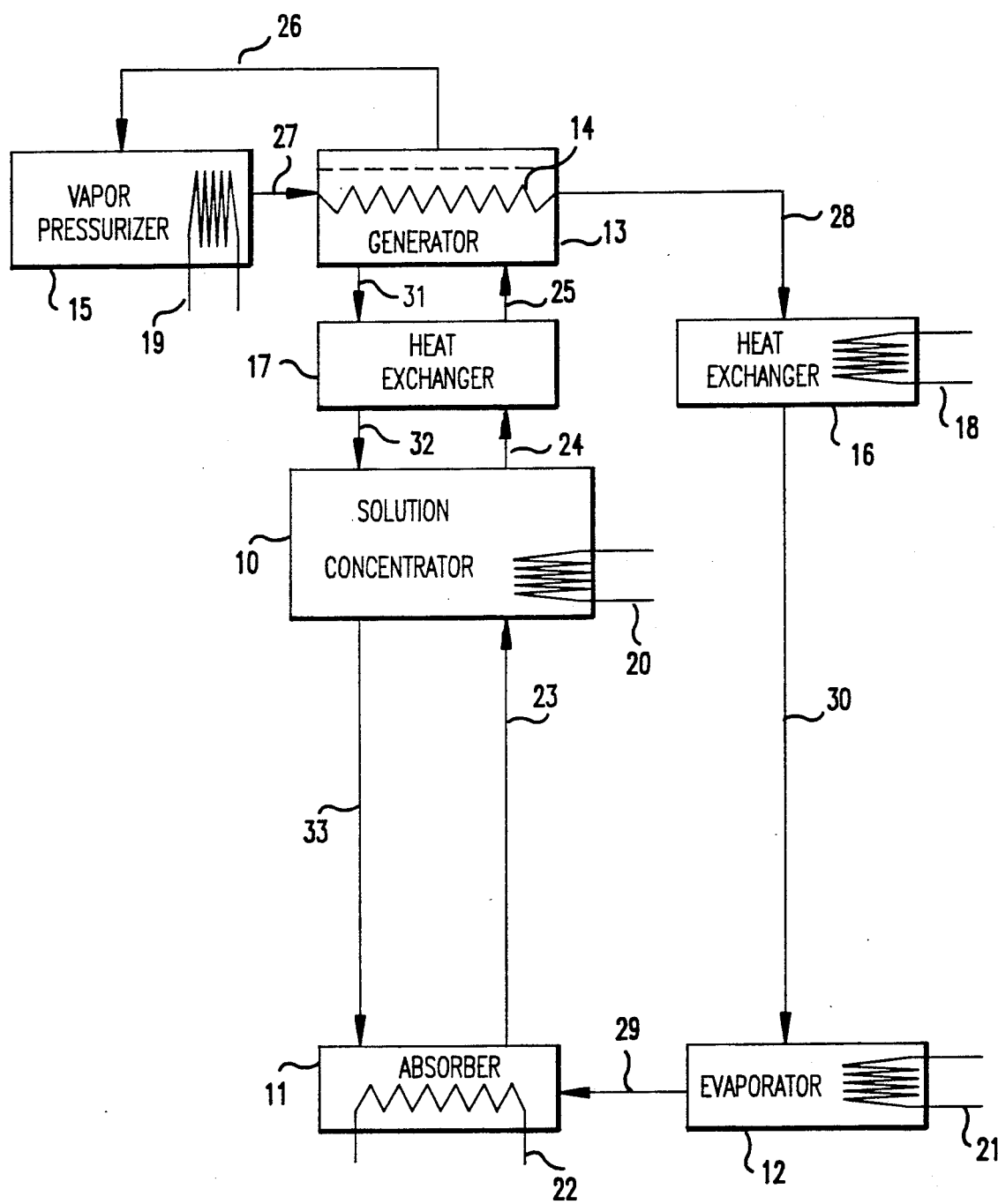
FIG. 1 is a schematic illustration of the improved absorption cooling and heating system according to one embodiment of this invention.

Referring to FIG. 1, preferred embodiments of this invention will now be described. It should be noted that the improved absorption cooling and heating cycle in no way is limited by choice of absorbent-refrigerant pairs. Example absorbent-refrigerant pairs are lithium bromide-water, water-ammonia, sulfuric acid-water, potassium hydroxide-water, and any absorbent-refrigerant pair that satisfies the functional requirements of prior art absorption cycles. It should also be noted that the improved absorption cooling and heating cycle in no way is limited by choice of the solution concentrator process. As used in the specification and claims hereof, concentrations of absorbent-refrigerant solution refer to relative concentrations of absorbent in the absorbent-refrigerant solution. Thus, increasing the concentration of the absorbent-refrigerant solution means that the ratio of the concentration of absorbent to the concentration of refrigerant in the absorbent-refrigerant solution has increased. Likewise, reducing the concentration of, or diluting, the absorbent-refrigerant solution means that the ratio of the concentration of absorbent to the concentration of refrigerant in the absorbent-refrigerant solution has decreased. Similarly, as used in the specification and claims hereof, absorbent-enriched solution is an absorbent-refrigerant mixture of increased concentration.

In one embodiment of this invention, refrigerant vapor in process line 29 from evaporator 12 is absorbed into a concentrated absorbent-refrigerant solution in absorber 11, reducing the concentration of the absorbent-refrigerant solution. The heat released by the absorption of the refrigerant vapor into the concentrated absorbent-refrigerant solution in absorber 11 is removed from the process and rejected through cooling coil 22. The reduced concentration absorbent-refrigerant solution is pumped through process line 23 to a solution concentrator 10 in which additional refrigerant is added to the absorbent-refrigerant solution or absorbent is removed from the absorbent-refrigerant solution, the effect of which is to reduce further the concentration of the absorbent-refrigerant solution. Any excess heat generated by solution concentrator 10 is removed and recovered through heat transfer coil 20. The dilute absorbent-refrigerant solution exits solution concentrator 10 through process line 24 and enters heat exchanger 17 where heat is added (or removed) to improve the thermal match with generator 13. Heat exchanger 17 is not required for the operation of this invention. However, using heat exchanger 17 will improve the overall energy efficiency of the process described by this invention by reducing the energy required to heat generator 13. The dilute absorbent-refrigerant solution exits heat exchanger 17 through process line 25 and enters generator 13.

In generator 13, refrigerant is evaporated or boiled-off from the dilute absorbent-refrigerant solution, increasing the concentration of the dilute absorbent-refrigerant solution and producing refrigerant vapor. The refrigerant vapor exits generator 13 through process line 26 and enters vapor pressurizer 15 where the pressure is increased sufficiently to allow condensation of the refrigerant vapor to liquid at a temperature greater than the operation temperature of generator 13. Excess thermal energy of vapor pressurizer 15 is removed and recovered in heat transfer coil 19 to maintain proper thermal balance in generator 13. The pressurized refrigerant vapor exits vapor pressurizer 15 through process line 27 and enters condenser 14 disposed within generator 13 where the refrigerant vapor condenses to pure refrigerant. The thermal energy evolved from this condensation process is transferred to the dilute absorbent-refrigerant solution in generator 13 where the thermal energy causes the refrigerant to evaporate or boil-off of the dilute absorbent refrigerant solution in generator 13.

The higher concentration dilute absorbent-refrigerant solution generated when the refrigerant is evaporated or boiled off from the dilute absorbent-refrigerant solution exits generator 13 through process line 31 and enters heat exchanger 17 where heat is removed (or added) to improve the thermal match with generator process 13. This higher concentration absorbent-refrigerant solution exits heat exchanger 17 through process line 32 and enters solution concentrator 10 in which refrigerant is removed or absorbent is added to this higher concentration absorbent-refrigerant solution, the effect of which is to increase further the concentration of the absorbent-refrigerant solution exiting through process line 33. Thus, any refrigerant removed from the absorbent-refrigerant solution is added to the absorbent-refrigerant solution entering solution concentrator 10 through process line 23 and exiting through process line 24, or any absorbent added to the absorbent-refrigerant solution between process lines 32 and 33 is removed from the absorbent-refrigerant solution between process lines 23 and 24 in solution concentrator 10. The concentrated absorbent-refrigerant solution in process line 33 enters absorber 11, completing the absorbent-refrigerant solution cycle.

The condensed pure liquid refrigerant from condenser 14 passes through process line 28 and enters heat exchanger 16. The sensible heat of the liquid refrigerant is recovered through heat transfer coil 18 to improve the overall thermal efficiency of the cycle and can be used for heat loads such as domestic hot water systems or other processes. The cooled liquid refrigerant exits heat exchanger 16 through process line 30 and is fed into evaporator 12 where the refrigerant is evaporated. The thermal energy required by evaporator 12 is provided by cooling coil 21 producing the cooling effect of the cycle. The refrigerant vapor exits evaporator 12 through process line 29 and enters absorber 11, thereby completing the pure refrigerant cycle.

Solution concentrator 10 according to preferred embodiments of this invention includes a range of technologies which can be used to increase the concentration of one solution while decreasing the concentration of another solution. The technologies can be used separately or in combination with each other. Some example methods of solution concentration include electro-dialysis, reverse osmosis, electrolysis and reverse electrolysis, and thermally driven evaporation/absorption processes.

Figure 2:
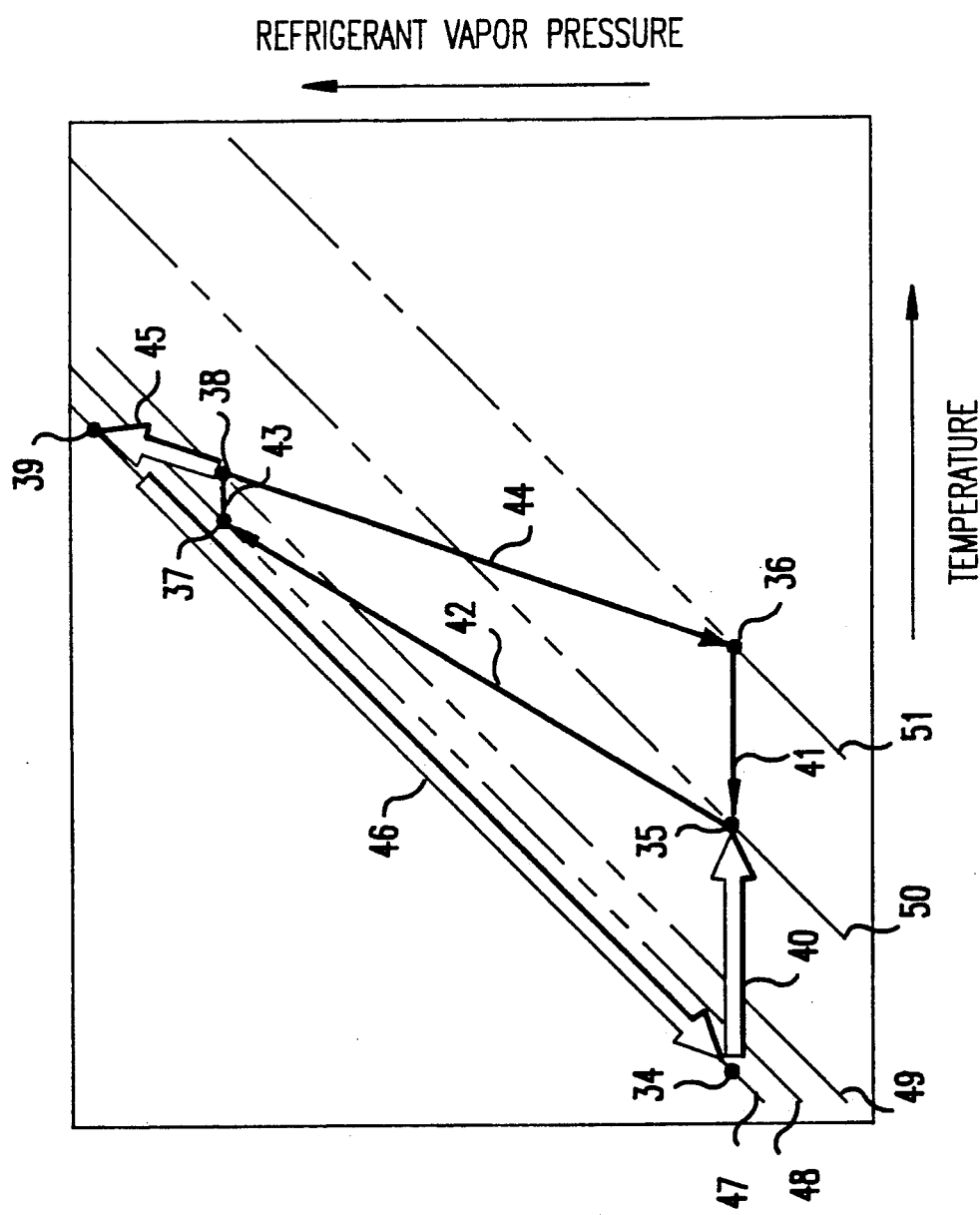
FIG. 2 is a Duhiring diagram (refrigerant vapor pressure vs. temperature for various absorbent-refrigerant solution concentrations) for an absorbent-refrigerant solution showing an example of this improved absorption cooling and heating cycle according to one embodiment of this invention.

Referring to FIG. 2, one embodiment of this invention is illustrated on a pressure versus temperature plot for a typical absorbent-refrigerant solution. A series of five lines, 47 48, 49, 50 and 51, indicates the vapor pressure versus temperature relationship for different concentrations of absorbent-refrigerant solution. Line 47 represents pure refrigerant while lines 48, 49, 50, and 51 represent absorbent-refrigerant solutions of increasing concentrations, respectively. Point 36 represents the condition of the absorbent-refrigerant solution as it enters absorber 11 through process line 33. Point 35 represents the condition of the absorbent-refrigerant solution as it exits absorber 11 through process line 23. Point 37 represents the condition of the absorbent-refrigerant solution as it enters generator 13 through process line 25. Point 38 represents the condition of the absorbent-refrigerant solution as it exits the generator 13 through process line 31. Point 36 represents the condition of the absorbent-refrigerant solution after it exits solution concentrator 10 through process line 33 and enters absorber 11 which completes the absorbent-refrigerant solution cycle. Point 39 represents the condition of the refrigerant in condenser 14. Point 34 represents the condition of refrigerant in evaporator 12 as it evaporates.

Line 41 represents the change in conditions of the absorbent-refrigerant solution in absorber 11 as refrigerant vapor is absorbed. Line 42 represents the change in conditions of the absorbent-refrigerant solution as it passes through solution concentrator 10 and heat exchanger 17 by way of process lines 23, 24, and 25. Line 43 represents the change in conditions of the absorbent-refrigerant solution in generator 13 as refrigerant vapor is removed. Line 44 represents the change in conditions of the absorbent-refrigerant solution as it passes through heat exchanger 17 and solution concentrator 10 by way of process lines 31, and 32 and enters absorber 11 by way of process line 33. Line 45 represents the pressurization of the refrigerant vapor from generator 13 by vapor pressurizer 15 as it enters condenser 14 by way of process line 27. Line 46 represents the change in conditions of the refrigerant as it exits condenser 14, passes through heat exchanger 16 and enters evaporator 12 by way of process lines 28 and 30. Line 40 represents the change in conditions of the refrigerant vapor as it exits evaporator 12 and enters absorber 11 by way of process line 29.

The temperature of the refrigerant represented by point 34 represents the temperature of the cooling effect provided by evaporator 12 to cooling coil 21. The temperature of the absorbent-refrigerant solution represented by line 41 between points 36 and 35 represents the temperature range over which the heat transferred to the refrigerant in evaporator 12 from cooling coil 21 is rejected in absorber 11 through heat transfer coil 22. The temperature between points 37 and 38 represent the operating temperature of the generator 13. The pressure difference between points 38 and 39 represents the pressure increase of refrigerant developed by vapor pressurizer 15. The temperature difference between points 39 and 38 represents the temperature driving force for transferring heat from condenser 14 to generator 13.

Figure 3:
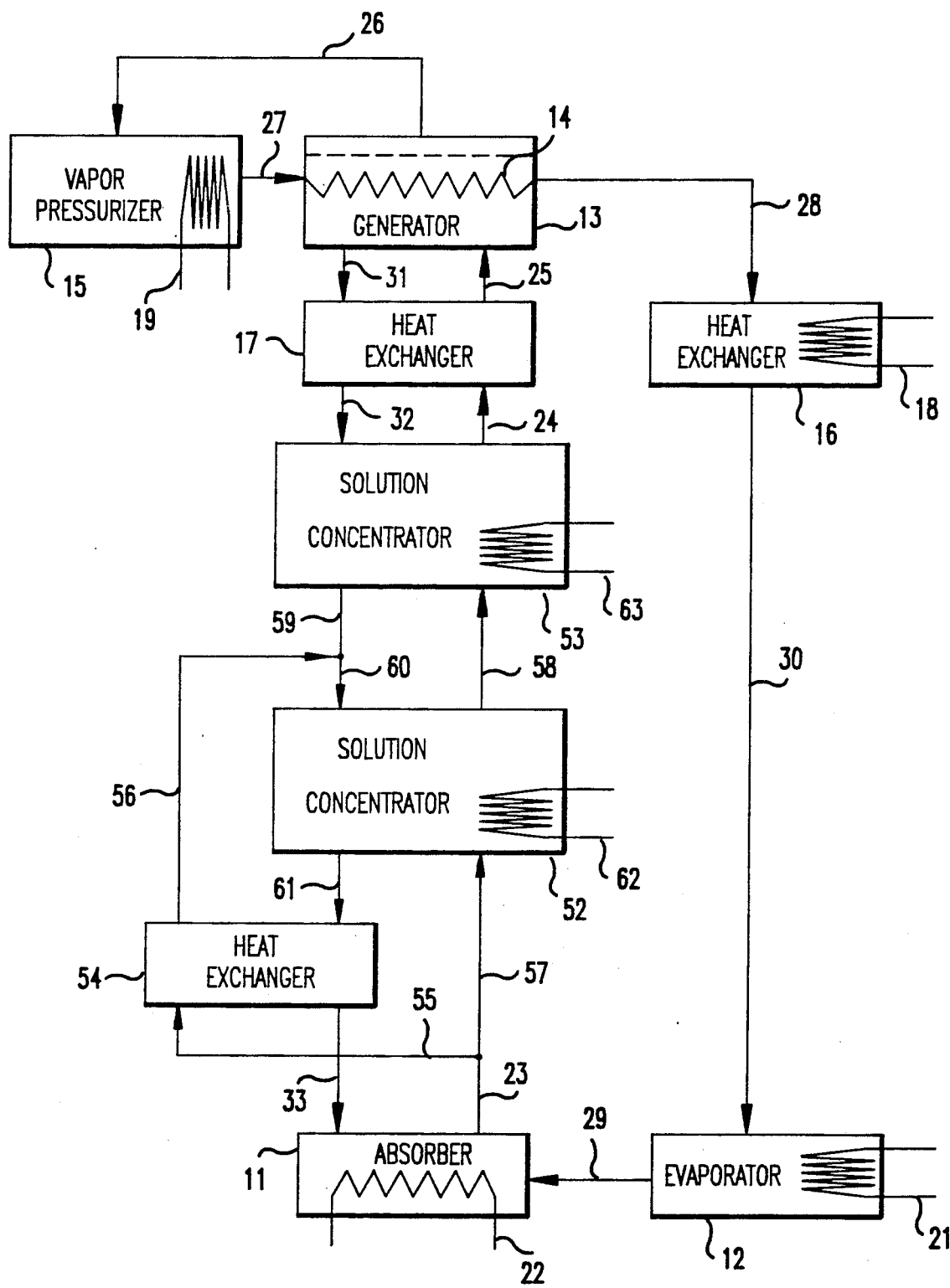
FIG. 3 is a further detailed schematic illustration of the improved absorption cooling and heating system according to another embodiment of this invention.

Referring to FIG. 3 showing another embodiment of this invention, and as shown in the embodiment shown in FIG. 1, refrigerant vapor in process line 29 from evaporator 12 is absorbed into a concentrated absorbent-refrigerant solution in absorber 11 reducing the concentration of the absorbent-refrigerant solution. The heat released by the absorption of the refrigerant vapor into the concentrated absorbent-refrigerant solution in absorber 11 is removed from the process and rejected through heat transfer coil 22. Unlike the embodiment shown in FIG. 1, the reduced concentration absorbent-refrigerant solution is pumped through process line 23 and split between process line 55 and 57.

The absorbent-refrigerant solution in process line 57 flows to first solution concentrator 52 in which additional refrigerant is added to the absorbent-refrigerant solution or absorbent is removed from the absorbent-refrigerant solution, the effect of which is to further reduce the concentration of the absorbent-refrigerant solution. This reduced concentration absorbent-refrigerant solution exits solution concentrator 52 and flows through process line 58 into second solution concentrator 53 in which additional refrigerant is added to the absorbent-refrigerant solution or absorbent is removed from the absorbent-refrigerant solution, the effect of which is to further reduce the concentration of the absorbent-refrigerant solution. This dilute absorbent-refrigerant solution exits second solution concentration 53 through process line 24 and enters a heat exchanger 17 where heat is added (or removed) to improve the thermal match with generator 13. Thereafter, the absorbent-refrigerant solution is processed in accordance with the embodiment shown in FIG. 1 until it exits heat exchanger 17.

From heat exchanger 17, the absorbent-refrigerant solution flows through process line 32 into second solution concentrator 53 in which refrigerant is removed from the absorbent-refrigerant solution or absorbent is added to the absorbent-refrigerant solution, the effect of which is to increase further the concentration of the absorbent-refrigerant solution exiting from second solution concentrator 53 through process line 59. The refrigerant removed from the absorbent-refrigerant solution is added to the absorbent-refrigerant solution entering second solution concentrator 53 through process line 58 and exiting through process line 24, or any absorbent added to the absorbent-refrigerant solution between process lines 32 and 59 is removed from the absorbent-refrigerant solution between process lines 58 and 24 in solution concentrator 53. Any excess heat generated by second solution concentrator 53 is removed and recovered through heat transfer coil 63. The absorbent-refrigerant solution in process line 59 is mixed with the absorbent-refrigerant solution in process line 56 and enters first solution concentrator 52 through process line 60. In first solution concentrator 52, additional refrigerant is removed from the absorbent-refrigerant solution or absorbent is added to the absorbent-refrigerant solution, the effect of which is to further increase the concentration of the absorbent-refrigerant solution exiting through process line 61. The refrigerant removed from the absorbent-refrigerant solution is added to the absorbent-refrigerant solution entering first solution concentrator 52 through process line 57 and exiting through process line 58, or any absorbent added to the absorbent-refrigerant solution between process lines 60 and 61 is removed from the absorbent-refrigerant solution between process lines 57 and 58 in first solution concentrator 52. Any excess heat generated by first solution concentrator 52 is removed and recovered through heat transfer coil 62. The concentrated absorbent-refrigerant solution from first solution concentrator 52 enters heat exchanger 54 through process line 61 and exits heat exchanger 54 through process line 33. The reduced concentration absorbent-refrigerant solution from absorber 11 enters heat exchanger 54 through process line 55 and exits through process line 56. The heat which is transferred between the concentrated absorbent-refrigerant solution exiting second solution concentration 53 through process line 59 and the reduced concentration absorbent-refrigerant solution in heat exchanger 54 is to improve the thermal match of first solution concentrator 52. Heat exchanger 54 is not required for the operation of this invention. However, using heat exchanger 54 will improve the overall energy efficiency of the process of this invention. The concentrated absorbent-refrigerant solution in process line 33 enters the absorber 11 completing the absorbent-refrigerant solution cycle.

The condensed pure liquid refrigerant in the condenser 14 is processed as before, exiting through process line 28 and entering heat exchanger 16. The sensible heat of the liquid refrigerant is recovered through heat transfer coil 18 to improve the overall thermal efficiency of the cycle and can be used for heat loads such as domestic hot water systems or other processes. The cooled liquid refrigerant exits heat exchanger 16 through process line 30 and is fed to evaporator 12 where the refrigerant is evaporated. The thermal energy required by evaporator 12 is provided by cooling coil 21 producing the cooling effect of the cycle. The refrigerant vapor exits evaporator 12 through process line 29 which completes the cycle.

First solution concentrator 52 and second solution concentrator 53 according to preferred embodiments of this invention include a range of technologies which can be used to increase the concentration of one solution while decreasing the concentration of another solution. The technologies can be used separately or in combination with each other. Some example methods of solution concentration include electro-dialysis, reverse osmosis, electrolysis and reverse electrolysis, thermal controlled vapor transport, and thermally driven evaporation/absorption process.

Figure 4:
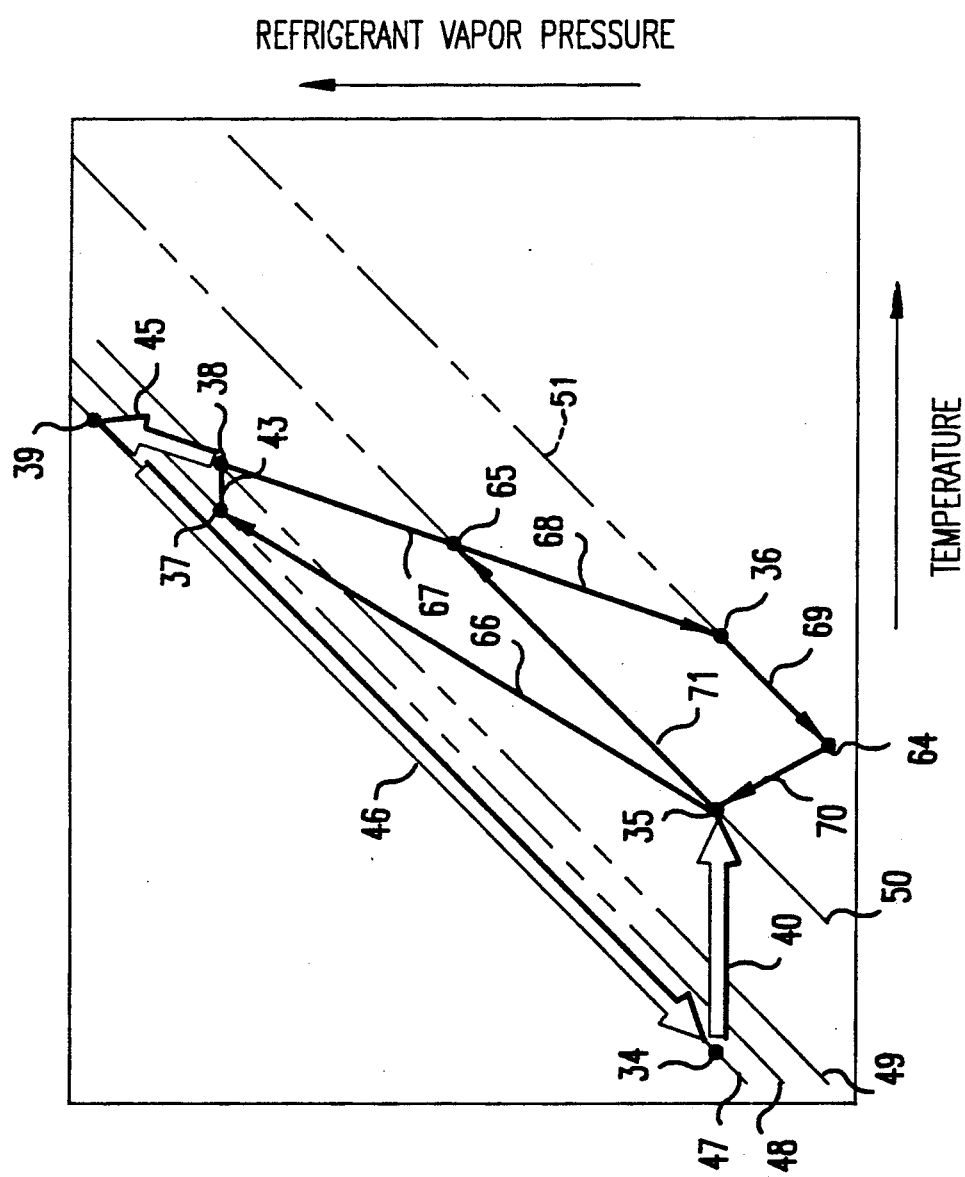
FIG. 4 is a Duhiring diagram (refrigerant vapor pressure vs. temperature for various absorbent-refrigerant solution concentrations) for an absorbent-refrigerant solution showing further details of an example of this improved absorption cooling and heating cycle according to the embodiment of this invention shown in FIG. 3.

Referring to FIG. 4, an embodiment of this invention in accordance with FIG. 3 is illustrated on a pressure vs.

temperature plot for a typical absorbent-refrigerant solution. As in the embodiments illustrated by FIG. 2, a series of five lines, 47, 48, 49, 50 and 51, indicate the vapor pressure versus temperature relationships for different concentrations of absorbent-refrigerant solution. Line 47 represents pure refrigerant while lines 48, 49, 50, and 51 represent absorbent-refrigerant solutions of increasing concentration respectively Point 64 represents the condition of the absorbent-refrigerant solution as it enters absorber 11 through process line 33. Point 35 represents the condition of the absorbent-refrigerant solution as it exits absorber 11 through process line 23. Point 37 represents the condition of the absorbent-refrigerant solution as it enters generator 13 through process line 25. Point 38 represents the condition of the absorbent-refrigerant solution as it exits generator 13 through process line 31. Point 65 represents the condition of the absorbent-refrigerant solution in process line 60 before entering first solution concentrator 52. Point 36 represents the condition of the absorbent-refrigerant solution after it exits first solution concentrator 52 through process line 61. Point 64 represents the condition of the absorbent-refrigerant solution after heat exchanger 54 and, as previously stated, exiting through process line 33 and entering absorber 11, completely the absorbent-refrigerant solution cycle. Point 39 represents the condition of the refrigerant in the condenser 14. Point 34 represents the condition of the refrigerant in the evaporator 12 as it evaporates.

Line 70 represents the change in conditions of the absorbent-refrigerant solution in absorber 11 as refrigerant vapor is absorbed. Line 66 represents the change in conditions of the absorbent-refrigerant solution as it passes through first solution concentrator 52, second solution concentrator 53 and heat exchanger 17 by way of process lines 57, 58, 24, and 25. Line 43 represents the change in conditions of the absorbent-refrigerant solution in generator 13 as refrigerant vapor is removed. Line 67 represents the change in conditions of the absorbent-refrigerant solution as it passes through heat exchanger 17 and second solution concentrator 53 and mixes with the absorbent-refrigerant solution in process line 56 by way of process lines 31, 32, 59 and 60. Line 68 represents the change in conditions of the absorbent-refrigerant solution as it passes through first solution concentrator 52 by way of process lines 60 and 61. Line 71 represents the change in conditions of the absorbent-refrigerant solution as it passes through heat exchanger 54 and mixes with the absorbent-refrigerant solution in process line 59 by way of process line 55, 56, and 60. Line 69 represents the change in conditions of the absorbent-refrigerant solution as it passes through heat exchanger 54 and enters absorber 11 by way of process line 61 and 33. Line 45 represents the pressurization of the refrigerant vapor from generator 13 by vapor pressurizer 15 as it enters condenser 14 by way of process lines 26 and 27. Line 46 represents the change in conditions of the refrigerant as it exits condenser 14, passes through heat exchanger 16 and enters evaporator 12 by way of process lines 28 and 30. Line 40 represents the change in conditions of the refrigerant vapor as it exits evaporator 12 and enters absorber 11 by way of process line 29.

The temperature of point 34 represents the temperature of the cooling effect provided by evaporator 12 to cooling coil 21. The temperature between points 64 and 35 represents the temperature range over which the heat removed from cooling coil 21 is rejected through heat transfer coil 22. The temperature between points 37 and 38 represent the operating temperature of generator 13. The pressure difference between points 38 and 39 represents the pressure increase developed by vapor pressurizer 15. The temperature difference between points 39 and 38 represents the temperature driving force for transferring heat from condenser 14 to generator 13.

Figure 5:
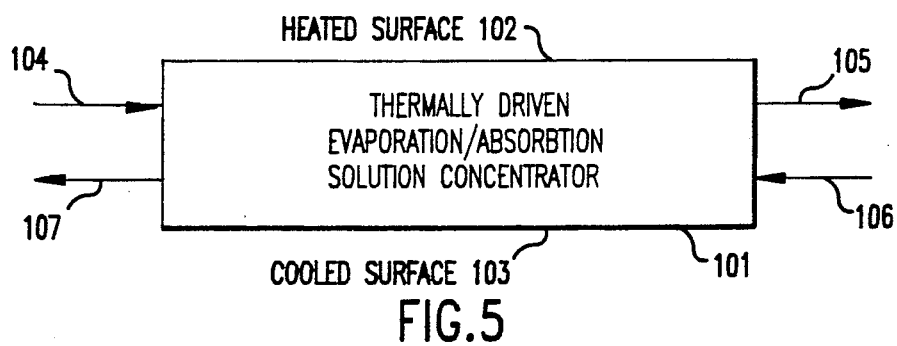
FIG. 5 is a schematic illustration of the thermally driven evaporation/absorption concentrator according to one embodiment of this invention.

FIG. 5 shows a preferred embodiment of the process of this invention in which the solution concentrator is a thermally driven evaporation/absorption solution concentrator 101. An absorbent-refrigerant solution from generator 13 enters thermally driven evaporation/absorption solution concentrator 101 through process line 104 wherein the concentration of the absorbent-refrigerant solution is increased and exits through process line 105. Another absorbent-refrigerant solution from absorber 11 enters thermally driven evaporation/absorption solution concentrator 101 through process line 106 wherein the concentration of the absorbent-refrigerant solution is decreased and exits through process line 107.

Figure 6:
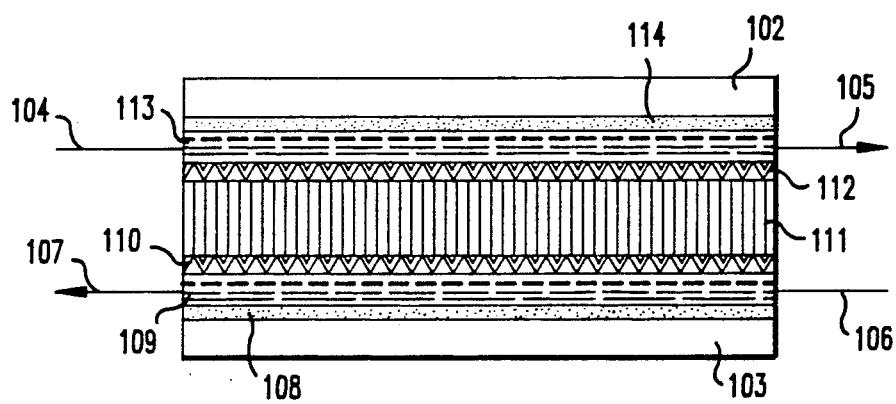
FIG. 6 is a detailed schematic illustration of the thermally driven evaporation/absorption solution concentrator shown in FIG. 5.

Thermally driven evaporation/absorption solution concentrator 101 according to one embodiment of this invention shown in FIG. 6 comprises: heated surface interface 102 where heat is added; first separator surface 114 comprised of a non-porous sheet; first fluid flow cavity 113 through which the absorbent-refrigerant solution flows in thermal contact with first separator surface 114; first gas porous, hydrophobic membrane 112 through which refrigerant vapor can pass but absorbent-refrigerant solution cannot pass or enter; gas porous, hydrophobic heat transfer barrier 111 through which refrigerant vapor can pass, but only with very low thermal conductivity, preferably such that the heat transferred per unit area by conduction is less than 5% of the heat added per unit area of heated surface interface 102; second gas porous, hydrophobic membrane 110 through which refrigerant vapor can pass but absorbent-refrigerant solution cannot pass or enter; a second fluid flow cavity 109 through which the absorbent-refrigerant solution flows in thermal contact with second separator surface 108; second separator surface 108 comprised of a non-porous sheet; and cooled surface interface 103. Heat provided to heated surface interface 102 is added to first separator surface 114 and transferred to absorbent-refrigerant solution flowing through first fluid flow cavity 113. Refrigerant vapor in equilibrium with the absorbent-refrigerant solution in first fluid flow cavity 113 passes through first hydrophobic membrane 112 and enters gas porous, hydrophobic heat transfer barrier 111. The refrigerant vapor flows through gas porous, hydrophobic heat transfer barrier 111 and enters and passes through second gas porous, hydrophobic membrane 110. The refrigerant vapor is absorbed by the absorbent-refrigerant solution flowing through second fluid flow cavity 109. The heat released by the refrigerant vapor absorption is transferred through second separator surface 108 and removed by cooled surface interface 103. The temperature of the absorbent-refrigerant solution in first fluid flow cavity 113 and the temperature of the absorbent-refrigerant solution in first fluid flow cavity 109 are controlled to maintain the refrigerant vapor pressure of the solution in first fluid flow cavity 113 greater than the refrigerant vapor pressure of the solution in second fluid flow cavity 109. The overall effect is to transfer refrigerant from the absorbent-refrigerant solution in first fluid flow cavity 113 to the absorbent-refrigerant solution in second fluid flow, cavity 109 thus increasing the concentration of the absorbent-refrigerant solution exiting through process line 105 and decreasing the concentration of the absorbent-refrigerant solution exiting through process line 107.

In a preferred embodiment of this invention, the characteristics of the porosity of elements 110, 111, and 112 are such that vapor transport occurs perpendicular to the plane of heated and cooled surfaces 102, 103 and not in the plane of these surfaces or parallel to the plane of these surfaces. In heat transfer barrier 111, this is achieved by assembling an array of tubes or honeycomb structure with open pores only perpendicular to the plane of heated and cooled surfaces 102, 103. In the gas porous membranes 110 and 112, this is achieved by compression of the membrane to close the porosity where the membrane contacts the tubes or honeycomb of the heat transfer barrier 111.

Figure 7:
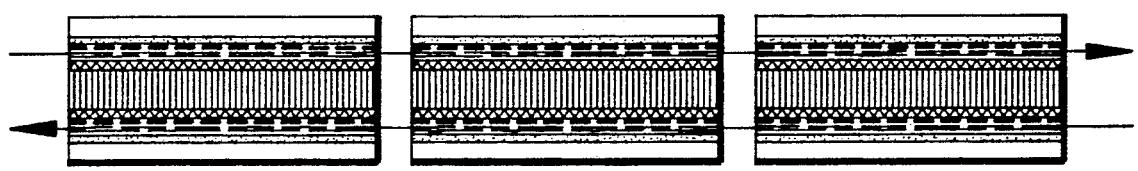
FIG. 7 is an illustration of series integration of the thermally driven evaporation/absorption solution concentrator shown in FIG. 5.
Figure 8:
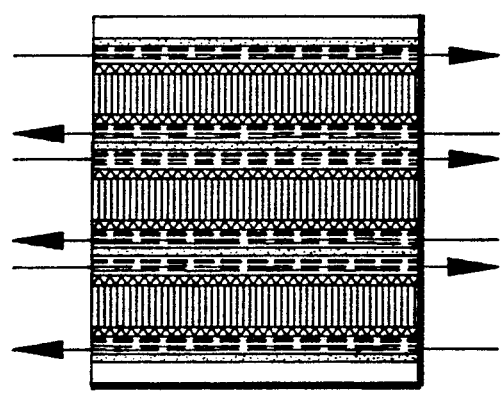
FIG. 8 is an illustration of parallel integration of the thermally driven evaporation/absorption solution concentrator shown in FIG. 5.

In one embodiment of this invention as shown in FIG. 7, the thermally driven evaporation/absorption solution concentrator or any other suitable solution concentrator, is arranged in series flow integrations. In another embodiment of this invention, the solution concentrator is arranged in parallel flow integrations, as illustrated in FIG. 8. In addition, combinations of parallel and series flow integrations can be used to improve the overall performance of the cycle. Series flow integrations are used to stage the concentration-dilution process of the solution concentrator and/or to prevent bulk vapor transport in the plane of the surface of the heat transfer barrier. Parallel flow integrations are used to cascade the thermal energy required by the solution concentrator process and thus improve the overall performance of the solution concentration process and, in turn, the absorption cooling and heating cycle of this invention.

In another embodiment of this invention, the thermally driven evaporation/absorption solution concentrator is modified to replace heat exchanger 17, generator 13, and vapor pressurizer 15. In this embodiment, process line 106 is eliminated and cooled surface interface 103 is used as a condenser in which the refrigerant vapor is condensed to produce pure refrigerant liquid. The thermal energy released by the condensation process can be recovered and used to drive the solution concentration process.

While in the foregoing specification this invention has been described in relation to certain preferred embodiments thereof, and many details have been set forth for purpose of illustration, it will be apparent to those skilled in the art that: the invention is susceptible to additional embodiments and that certain of the details described herein can be varied considerably without departing from the basic principles of the invention.

I claim:

1. In an absorption process for cooling wherein, an absorbent-refrigerant solution from an absorber is heated in a generator producing absorbent-refrigerant vapor, said absorbent-refrigerant vapor is separated and condensed producing pure liquid refrigerant and an absorbent-enriched solution, said absorbent-enriched solution is returned to said absorber, said pure liquid refrigerant is evaporated producing pure refrigerant vapor, said pure refrigerant vapor is absorbed into said absorbent-enriched solution, the improvement comprising:
   a. generating simultaneously a dilute absorbent-refrigerant solution and a concentrated absorbent-refrigerant solution in a solution concentration means between said absorber and said generator;
   b. heating said dilute absorbent-refrigerant solution producing a first pure refrigerant vapor and said absorbent-enriched solution;
   c. condensing said first pure refrigerant vapor in said generator in thermal contact with said absorbent-enriched solution producing pure liquid refrigerant;
   d. evaporating said pure liquid refrigerant producing a second pure refrigerant vapor; and
   e. absorbing said second pure refrigerant vapor into said concentrated absorbent-refrigerant solution.

2. The process of claim 1, wherein said solution concentration means comprises at least one solution concentrator.

3. The process of claim 1, wherein said first pure refrigerant vapor is heated to a vapor temperature greater than the generator temperature of said generator by pressurizing said first pure refrigerant vapor.

4. The process of claim 3, wherein said first pure refrigerant vapor is pressurized by one of a compressor and an ejector powered by a pressurized steam source having a steam pressure greater than said pure refrigerant vapor pressure.

5. The process of claim 1, wherein said absorbent-refrigerant solution is lithium bromide-water.

6. The process of claim 2, wherein said first pure refrigerant vapor is heated to a vapor temperature greater than the generator temperature of said generator by pressurizing said first pure refrigerant vapor.

7. The process of claim 6, wherein said absorbent-refrigerant solution is lithium bromide-water.

8. An absorption cooling and heating system comprising:
   a solution concentrator having a first concentrator discharge opening, a second concentrator discharge opening, a first concentrator inlet opening and a second concentrator inlet opening;
   a generator having a generator inlet opening in communication with said first concentrator discharge opening, said generator having a first generator discharge opening and a second generator discharge opening;
   said second generator discharge opening in communication with said second concentrator inlet opening;
   means for pressurizing having a pressurizer inlet opening in communication with said first generator discharge opening, said means having a pressurizer discharge opening;
   a condenser disposed inside said generator having a condenser inlet opening in communication with said pressurizer discharge opening and a condenser outlet opening;
   a heat exchanger having an exchanger inlet opening in communication with said condenser outlet opening, said heat exchanger having an exchanger outlet opening;
   an absorber having a first absorber inlet opening in communication with said evaporator outlet opening, a second absorber inlet opening in communication with said second concentrator discharge opening and an absorber discharge opening in communication with said first concentrator inlet opening.

9. The system of claim 8, wherein the solution concentrator comprises one of an electrodialysis process, a reverse osmosis process or an electrolysis process to produce dilute absorbent-refrigerant solution and concentrated absorbent-refrigerant solution.

10. The system of claim 8, wherein said pressurizer is one of a vapor compressor and an ejector powered by a pressurized steam source.

11. The system of claim 8, wherein said solution concentrator is thermally driven.

12. The system of claim 11, wherein said solution concentrator further comprises a plurality of layers comprising a heated surface interface layer;
- a first separator surface layer adjacent said heated surface interface layer;
- a first fluid flow cavity layer adjacent said first separator layer through which an absorbent-refrigerant solution flows in thermal contact with said first separator surface layer;
- a first gas porous, hydrophobic membrane layer adjacent said first fluid flow cavity layer and capable of passing a refrigerant vapor but not said absorbent-refrigerant solution;
- a gas porous, hydrophobic heat transfer barrier layer adjacent said first gas porous, hydrophobic membrane layer and capable of passing said refrigerant vapor at thermal conductivities such that heat transferred by conduction per unit area of said gas porous, hydrophobic heat transfer barrier layer is less than about 5% of the heat added through said heated surface interface layer per unit area of said heated surface interface layer;
- a second gas porous, hydrophobic membrane layer adjacent said gas porous, hydrophobic heat transfer barrier layer and capable of passing said refrigerant vapor but not said absorbent-refrigerant solution;
- a second fluid flow cavity layer adjacent said second gas porous, hydrophobic membrane layer through which said absorbent-refrigerant solution flows in thermal contact with a second separator surface layer;
- said second separator surface layer being disposed adjacent said second gas porous, hydrophobic membrane layer; and
- a cooled surface interface layer adjacent said second separator surface layer.

13. The system of claim 12, wherein said first separator surface layer and said second separator surface layer comprise non-porous sheets.

14. The system of claim 13, wherein said first gas porous, hydrophobic membrane, layer, said gas porous, hydrophobic heat transfer barrier layer and said second gas porous, hydrophobic membrane layer have a porosity whereby vapor transport occurs perpendicular to a plane of said heated surface layer and said cooled surface layer.

15. The system of claim 14, wherein said gas porous, hydrophobic heat transfer barrier layer comprises one of an array of tubes and a honeycomb structure having open pores only perpendicular to said plane of said heated surface layer and said cooled surface layer.

16. The system of claim 12, wherein said first gas porous, hydrophobic membrane layer, said gas porous, hydrophobic heat transfer barrier layer and said second gas porous, hydrophobic membrane layer have a porosity whereby vapor transport occurs perpendicular to a plane of said heated surface layer and said cooled surface layer.

17. The system of claim 12, wherein said gas porous, hydrophobic heat transfer barrier layer comprises one of an array of tubes and a honeycomb structure having open pores only perpendicular to said plane of said heated surface layer and said cooled surface layer.

18. The process of claim 6, wherein said first pure refrigerant vapor is pressurized by one of a compressor and an ejector powered by a pressurized steam source having a steam pressure greater than said pure refrigerant vapor pressure.

19. The process of claim 1, wherein said first pure refrigerant vapor condenses at the vapor pressure temperature of said absorbent-enriched solution and a heat pump is used to increase the thermal energy released from said first pure refrigerant vapor to a refrigerant vapor temperature greater than an operating temperature of said generator.

* * * * *